United States Patent
Hemanth et al.

(10) Patent No.: US 12,413,795 B2
(45) Date of Patent: Sep. 9, 2025

(54) EXTENDED REALITY AS A SERVICE UTILIZING A WIRELESS TELECOMMUNICATION NETWORK

(71) Applicant: T-MOBILE INNOVATIONS LLC, Overland Park, KS (US)

(72) Inventors: Sumanth Bellam Hemanth, Bothell, WA (US); Anis Adil Anis, Bay Point, CA (US)

(73) Assignee: T-Mobile Innovations LLC, Overland Park, KS (US)

( * ) Notice: Subject to any disclaimer, the term of this patent is extended or adjusted under 35 U.S.C. 154(b) by 40 days.

(21) Appl. No.: 18/400,617

(22) Filed: Dec. 29, 2023

(65) Prior Publication Data
US 2025/0220250 A1    Jul. 3, 2025

(51) Int. Cl.
*H04N 21/218*    (2011.01)
*H04N 21/266*    (2011.01)
*H04N 21/442*    (2011.01)
*H04N 21/472*    (2011.01)

(52) U.S. Cl.
CPC ..... *H04N 21/21805* (2013.01); *H04N 21/266* (2013.01); *H04N 21/44213* (2013.01); *H04N 21/472* (2013.01)

(58) Field of Classification Search
CPC ........... H04N 21/21805; H04N 21/266; H04N 21/44213; H04N 21/472
See application file for complete search history.

(56) References Cited

U.S. PATENT DOCUMENTS

| | | | |
|---|---|---|---|
| 12,231,483 B1* | 2/2025 | Harviainen | H04L 65/80 |
| 2012/0133638 A1* | 5/2012 | Davison | G06T 19/00 |
| | | | 345/419 |
| 2023/0082513 A1* | 3/2023 | Rowley | H04N 5/2224 |
| | | | 345/420 |

* cited by examiner

*Primary Examiner* — Mulugeta Mengesha
(74) *Attorney, Agent, or Firm* — Shook, Hardy & Bacon L.L.P.

(57) ABSTRACT

Systems and methods are provided for providing real-time virtual viewing content of a live event to a user equipment on a wireless communications network. Source information of the live event, which is processed on an edge computing device located within a threshold distance of the live event, is provided to a first user equipment. A second user equipment requesting to view the live event is identified, and the same source information that was provided to the first user equipment is provided to the second user equipment. Based on the same source information, the first user equipment is presented with a first virtual view at a first time that is different from a second virtual view presented to the second user equipment at the first time.

20 Claims, 4 Drawing Sheets

EXTENDED REALITY AS A SERVICE UTILIZING A WIRELESS TELECOMMUNICATION NETWORK

SUMMARY

The present disclosure is directed to systems and methods for managing extended reality (XR) as a service for XR devices and applications utilizing a wireless connection to a telecommunication network, substantially as shown and/or described in connection with at least one of the Figures, and as set forth more completely in the claims.

According to various aspects of the technology, source information of a live event is processed on an edge computing device and communicated to XR devices or a conventional user equipment (UE) utilizing an XR application. XR devices and UEs running XR applications are becoming increasingly prolific; however, technological limitations and connectivity options restrict the wide acceptance of XR technology. For example, technological and connectivity limitations frequently require the use of three degrees-of-freedom (DOF), which refers to an experience that tracks the rotation of a user's head but does not track their position or movements in a space. While three DOF experiences can still provide some level of immersion, more robust technologies and infrastructure is necessary to handle the real-time data processing and transmission requirements for a fully immersive XR experience. When using XR, momentary but sudden increases in latency, or any other performance degradation, can cause the XR experience to jump from one scene to another without fluidity. Aside from the performance degradation, such undesirable conditions can cause a user to get frustrated or even motion sick, especially with reduced fluidity or fewer-than-normal degrees of freedom. Moreover, coverage limitations exist, especially in remote locations like national parks. Mobility and seamless transitions are essential aspects of XR, but technological and connectivity limitations lack the necessary mobility to support uninterrupted transitions between network access points, resulting in disruptions and a loss of immersion. To overcome these issues, the present disclosure utilizes a wireless telecommunication network to provide a fully immersive XR experience with high bandwidth and low latency capabilities.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
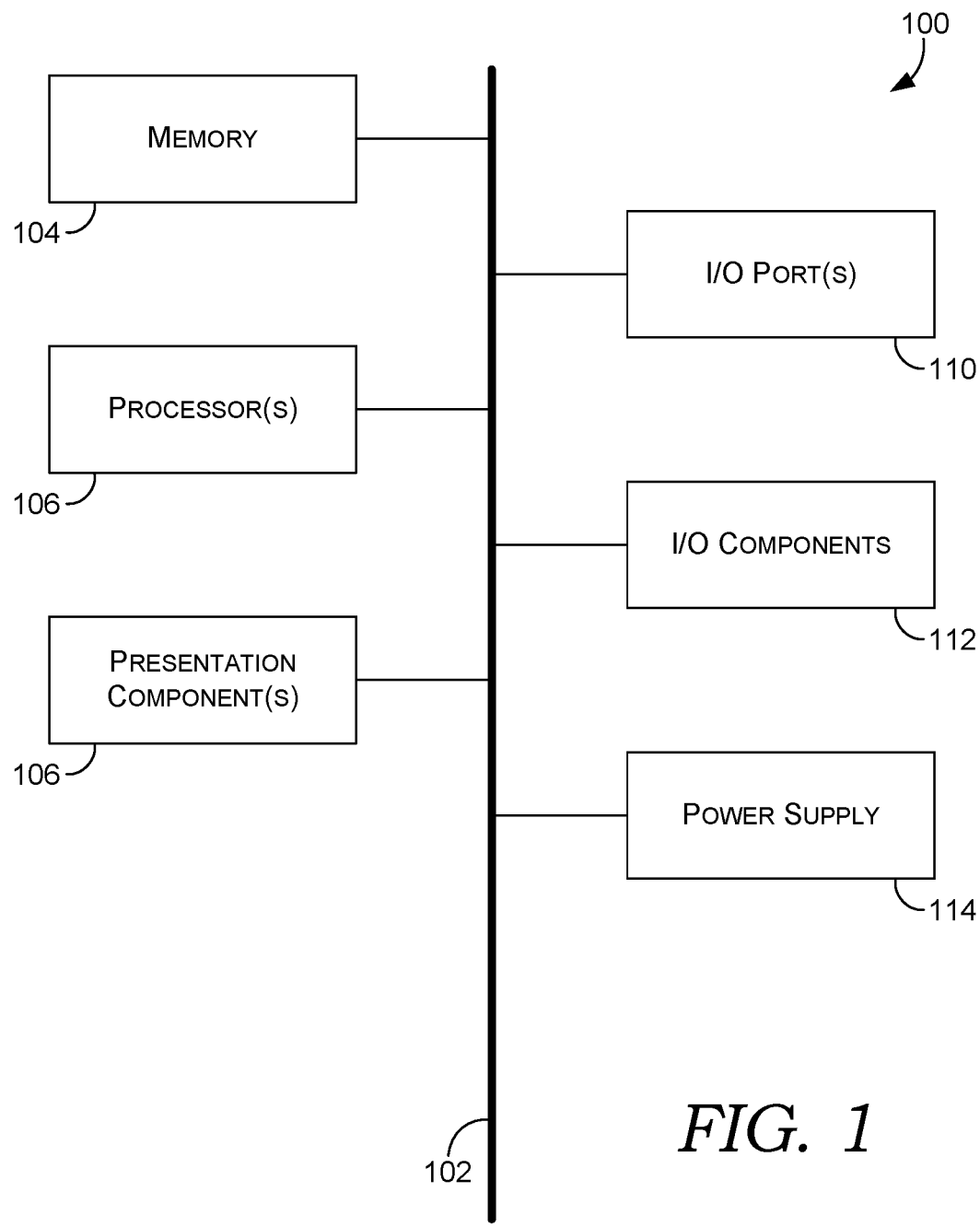
FIG. 1 illustrates an exemplary computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "base station" refers to a centralized component or system of components that is configured to wirelessly communicate (receive and/or transmit signals) with a plurality of stations (i.e., wireless communication devices, also referred to herein as user equipment (UE(s))) in a geographic service area. A base station suitable for use with the present disclosure may be terrestrial (e.g., a fixed/non-mobile form such as a cell tower or a utility-mounted small cell) or may be extra-terrestrial (e.g., an airborne or satellite form such as an airship or a satellite). The terms "latency" and "jitter" are used in their ordinary sense; that is, latency refers to the time it takes for a packet (or series of packets) to travel from its source to its destination (via a network), and jitter refers to variations in latency. The term "source information" of a live event refers to any information and/or data originating from a live event (e.g., recorded at the live event by a recording device) that can be used to provide a user device with a virtual experience of the live event. The term "live event" refers to any event or location that may be captured by a recording device in order to provide a user device with a virtual experience of the live event (e.g., sporting event, art, museums, national parks, etc.). The terms "edge computing device" and "mobile edge computing" (MEC) may refer to any piece of hardware that brings computation and data storage closer to a source(s) of data (e.g., Multi-Access Edge Computing technology).

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media. Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, extended reality (XR) is a category of technologies that modify or replace a user's perception of their surroundings, typically by way of a wearable device with sensory outputs (visual display, tactile output, audible output, and the like). At least for the purposes of the present disclosure, the concepts of augmented reality (AR), mixed reality (MR), and virtual reality (VR) are all encompassed by the category of XR. In AR and MR, computer-generated information is displayed with (e.g., superimposed over) a user's actual surroundings; often, such technology is utilized by smartphones or other UEs that utilize a rear-facing camera and forward-facing display to overlay simulated (i.e., computer-generated) data with the real surroundings as captured by the camera. In VR, a simulated environment entirely supplants the user's actual surroundings, often accomplished by goggles or other immersive and wearable technology. In order for XR to operate effectively, robust connections and/or computer processing components are required. Particularly when used to interact with other users, the ability of XR to function effectively relies on a high performing and highly stable data connection. Traditionally, wireless connections to cellular or other telecommunication networks were relatively unaffected by modest disturbances to throughput, latency, and jitter; for example, users may not detect disturbances lasting 200 ms or less when leveraging a wireless connection for messaging and ordinary data sessions. However, the human eye can easily perceive discontinuous motion with gaps as little as a few milliseconds; that is, if a user was using XR and the data connection supporting the computer-generated graphics experienced a disturbance lasting more than a few milliseconds, the user would be likely to notice. Discontinuous display of computer-generated graphics could easily lead to user frustration, motion sickness, hesitation to technological adoption, or cessation of existing use-all due to degradations in XR performance.

Existing solutions include architectures where almost all processing is done at a user device. Such existing solutions experience difficulties due to bandwidth constraints that pose challenges for delivering high-resolution visuals and real-time tracking required by XR, especially when processing is performed far away from where data originates from (e.g., from a recording device at a live event). When these demands exceed the capabilities of the user device or a mobile communications network, the connections often suffer latency issues, data transmission issues, and user input response issues, which ultimately affects the sense of presence and interactive fluidity of the user in a virtual environment of a live event. In contrast to conventional device-based solutions, the present solution is directed to using a network-based solution that combines edge computing and a wireless telecommunication network to provide a seamless virtual experience for a user equipment.

A first aspect of the present disclosure is directed to a method for providing real-time virtual viewing content of a live event to a user equipment on a wireless communications network comprising providing source information of the live event to a first user equipment, wherein the source information is processed on an edge computing device located within a threshold distance of the live event. The method further comprises identifying a second user equipment requesting to view the live event. The method further comprises providing the same source information of the live event to the second user equipment that was provided to the first user equipment. The method further comprises presenting the first user equipment with a first virtual view at a first time and presenting the second user equipment with a second virtual view at the first time based on the same source information, wherein the first virtual view is different than the second virtual view.

A second aspect of the present disclosure is directed to one or more non-transitory computer readable media that, when executed by one or more computer processing components, cause the one or more computer processing components to perform a method for providing real-time virtual viewing content of a live event to a user equipment on a wireless communications network. The method comprises providing source information of the live event to a first user equipment, wherein the source information is processed on an edge computing device located within a threshold distance of the live event. The method further comprises identifying a second user equipment requesting to view the live event. The method further comprises providing the same source information of the live event to the second user equipment that was provided to the first user equipment. The method further comprises presenting the first user equipment with a first virtual view at a first time and presenting the second user equipment with a second virtual view at the first time based on the same source information, wherein the first virtual view is different than the second virtual view.

A third aspect of the present disclosure is directed to a system for providing real-time virtual viewing content of a live event to a user equipment on a wireless communications network. The system comprises a mobile communications network, at least one node configured to provide access to the mobile communications network, and an extended reality manager. The extended reality manager is configured to provide source information of the live event to a first user equipment, wherein the source information is processed on an edge computing device located within a threshold distance of the live event. The extended reality manager is further configured to identify a second user equipment requesting to view the live event. The extended reality manager is further configured to provide the same source information of the live event to the second user equipment that was provided to the first user equipment. The extended reality manager is further configured to present the first user equipment with a first virtual view at a first time and present the second user equipment with a second virtual view at the first time based on the same source information, wherein the first virtual view is different than the second virtual view.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device, The computing device 100 may take many forms; non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Figure 2:
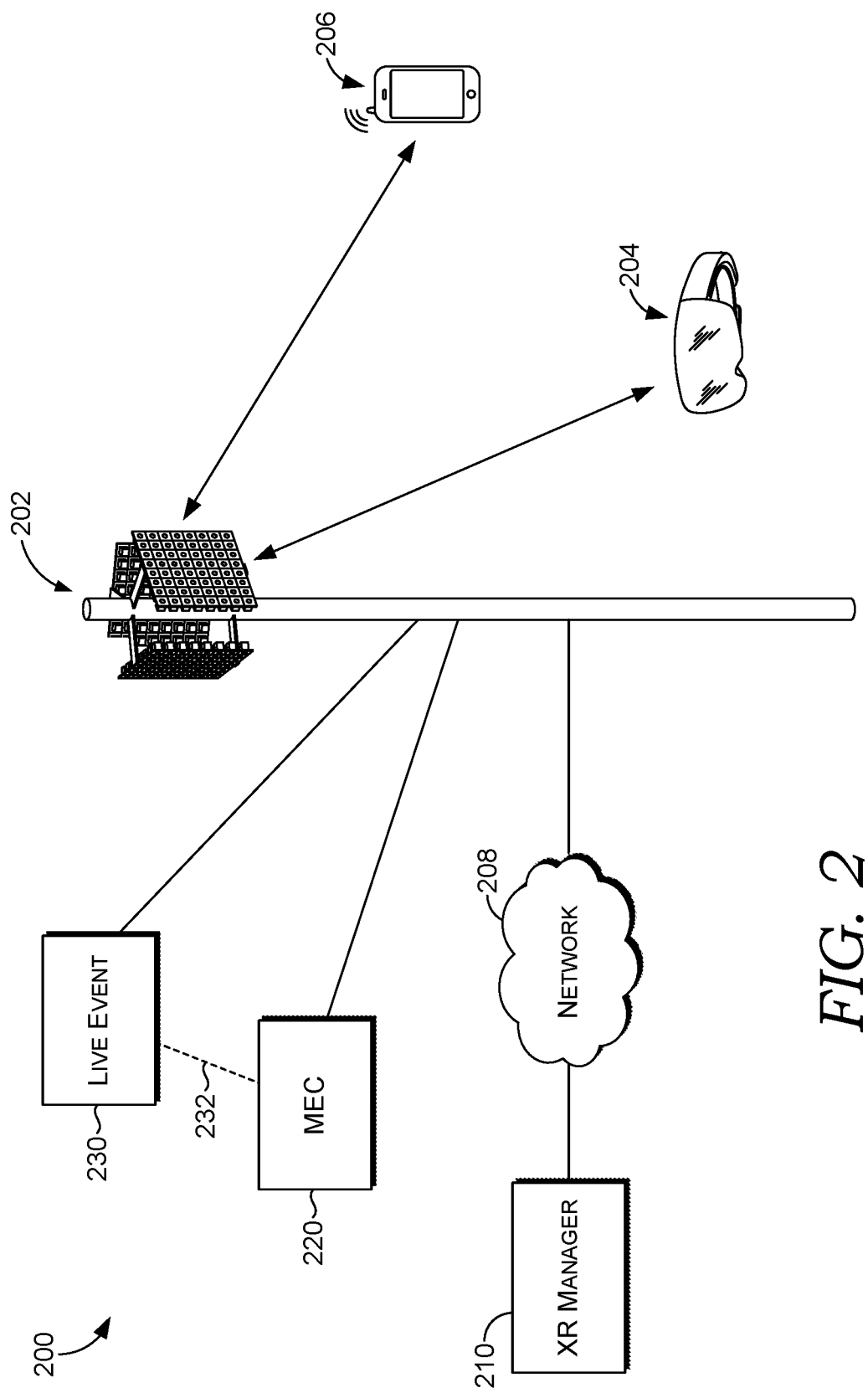
FIG. 2 illustrates a diagram of an exemplary environment in which implementations of the present disclosure may be employed.

Turning now to FIG. 2, a representative network environment in which the present disclosure may be carried out is illustrated. Such a network environment is illustrated and designated generally as network environment 200. Network environment 200 is but one example of a suitable network environment and is not intended to suggest, including by the form of any illustrated component thereof, any limitation as to the scope of use or functionality of the invention. Neither should the network environment be interpreted as having any dependency or requirement relating to any one or combination of components illustrated. The network environment 200 generally represents a high-level model for wirelessly communicating between a live event, a base station and one or more XR devices in order to provide a virtual experience of the live event, as discussed in greater detail herein. The network environment 200 comprises a base station 202, a first user equipment (UE) 204, a second UE 206, a network 208, an XR manager 210, a MEC 220, a live event 230, and a distance 232 (e.g., a threshold distance) between the MEC 220 and the live event 230.

The network environment 200 comprises at least one base station 202 that is configured to wirelessly communicate with one or more user devices, such as the computing device 100 of FIG. 1, which may take the form of the first UE 204 and/or the second UE 206. For the purposes of this disclosure, a base station is used in its general sense, being defined as a station for transmitting and/or receiving RF signals; accordingly, the base station 202 may take the form of a cellular node (e.g. eNodeB, gNodeB, etc.), a relay, an access point (e.g., a Wi-Fi router), or any other desirable emitter and/or receiver of signals that transmits and/or receives wireless signals to/from one or more UEs. A suitable base station is not protocol-specific, it may be configured to be any wireless telecommunication protocol that is compatible with the first UE 204 and/or the second UE 206, such as 4G, 5G, 6G, 802.11x, or any other wireless standard. A suitable base station is also not exclusive to cellular telecommunication networks, it may take the form of any wireless communication system and used at any desirable frequency. As illustrated, the base station 202 may take the form of a macro cell; however, the base station 202 may take any desirable form, such as a small cell, or a residential Wi-Fi router. As seen in the embodiment illustrated by FIG. 2, base stations may be terrestrial, that is, they are coupled to the earth via a tower or some other structure, such as the first base station 202; alternatively, a suitable base station may be extra-terrestrial, that is coupled to an aircraft or a satellite.

The network environment 200 comprises the network 208. The network 208 comprises any number of components that are generally configured to provide voice and/or data services to wireless communication devices, such as the first UE 204 and the second UE 206, which are wirelessly connected to the base station 202. For example, the network 208 may comprise one or more additional wireless base stations, a core network, an IMS network, a PSTN network, or any number of servers, computer processing components, and the like. The network 208 may include access to the World Wide Web, internet, or any number of desirable data sources which may be queried to fulfill requests from wireless communication devices that make requests via the base station 202.

The network environment 200 comprises one or more UEs, with which the base station 202 connects to the network 208. Generally, each of the first UE 204 and the second UE 206 may have any one or more features or aspects described with respect to the computing device 100 of FIG. 1. Though the first UE 204 is illustrated as a dedicated XR-specific device (e.g., wearable VR goggles) and the second UE 206 is illustrated as an XR-agnostic device (illustrated as a smart phone), it should be understood that each of the first UE 204 and the second UE 206 may take any form of an XR device. As used herein, the term "XR device" means any computing device that is executing an XR application. An XR device may be in the form of an XR-specific device (e.g., VR goggles, AR glasses), which is designed and intended for use primarily with XR applications. An XR device may alternatively be in the form of an XR-agnostic device, such as the second UE 206 in the case as illustrated in FIG. 2, wherein an XR-agnostic device refers herein to a device that is capable of executing (or is presently executing) an XR application but which is not designed or intended primarily for executing XR applications. For example, an XR-agnostic device may be a more general computing device that is capable of executing an XR application thereon (e.g., a smart phone or a tablet).

Though a single base station is illustrated in FIG. 2, the network environment 200 may comprise multiple base stations, including multiple base stations that serve the same UE, such as through the use of dual connectivity technology; further, additional base stations may provide overlapping or auxiliary coverage in the event an outage occurs at the base station 202. For the purposes of present disclosure, it is sufficient to illustrate that one or more sets of downlink signals originate from, and one or more uplink signals are received at, the base station 202, which utilizes wireless connections to bridge connected UEs to the network 208. It is also contemplated that the network environment 200 may comprise one or more base stations that facilitate communication between the MEC 220 and a recording device at the live event 230.

The network environment 200 comprises one or more computer processing components that form the XR manager 210. The XR manager 210 may comprise one or more components, taking the form of any combination of hardware components, logical components, and computer-programmed services running on one or more computer processing components that are generally configured to manage a method for providing real-time virtual viewing content of a live event to a user equipment on a wireless communications network. In addition to aspects discussed with regard to FIG. 2, an illustration and description of an exemplary method that the XR manager 210 may facilitate is discussed with regard to FIG. 3. The XR manager 210, including its one or more subcomponents, may be disposed at or near the base station 202, within or adjacent to the network 208, or disposed in multiple locations.

The network environment 200 comprises an edge computing device, MEC 220. In order to efficiently process data and enhance the overall responsiveness of the system, the MEC 220 can be located within a threshold distance 232 of the live event 230. For example, the threshold distance 232 could be 1 mile, 5 miles, or 15 miles. The threshold distance 232 could also be such that the MEC 220 is located on-site at the live event 230. This allows for streamlined processing and contributes to a smooth user experience when providing 6 DOF to a user. The MEC 220 can receive source information from a recording device (e.g., recording device 302 in FIG. 3). In some aspects, the source information may pass through one or more multiple-system operators (MSO) before reaching the MEC 220 from the live event 230. In some aspects, the source information may pass through one or more base stations before reaching the MEC 220 from the live event 230.

The source information of the live event 230 can be processed and stored at the MEC 220. When the XR manager 210 identifies a first UE 204 that is requesting to view the live event 230, the first UE 204 can be provided with the source information processed at the MEC 220. In some aspects, the source information may pass through one or more multiple-system operators (MSO) before reaching the first UE 204 from the MEC 220. In some aspects, the source information may pass through one or more base stations before reaching the first UE 204 from the MEC 220.

The XR manager 210 can provide the source information of the live event 230 to the first UE 204 in various ways. For example, the source information could be provided as a unicast to the first UE 204 (e.g., a unique connection is established with the first UE 204). In such an embodiment, a majority of the processing of the source information in order to provide a first virtual view of the live event 230 at a first time to the first UE 204 occurs at the MEC 220. In some aspects, the first UE 204 can provide sensor data (e.g., individual user input) captured by the first UE 204 of a user to the MEC 220. The MEC 220 can process the sensor data from the first UE 204 and respond by providing the processed source information of the live event 230 necessary for the first virtual view to be presented to the first UE 204. For example, the source information received by the first UE 204 can be video and/or audio streams rendered by the MEC 220 based on the received input from the first UE 204. This ensures a personalized and tailored experience for each user.

In another example, the XR manager 210 can provide the source information of the live event 230 to the first UE 204 as a broadcast and/or a multicast. In such an embodiment, the first UE 204 and any other UE (e.g., second UE 206) requesting to view the live event 230 are provided with source information processed at the MEC 220 in the form of a signal that is sent to all UEs. The network provider may dedicate a network slice to handle the processing of the source information and the providing of the source information to the first UE 204 and the second UE 206. Dedicating the network slice would simplify a way for UEs (e.g., the firs UE 204 and the second UE 206) to connect and begin being presented with virtual views of the live event 230. In some aspects, the source information processed by the MEC 220 and provided to the first UE 204 and the second UE 206 contains all virtual views of the live event 230 that can be presented to the first UE 204 and the second UE 206. The first UE 204 and the second UE 206 can be responsible for determining their own locations within a virtual environment of the live event 230 based on the source information provided by the MEC 220 and tracking their movements (e.g., sensor data in the form of a user-generated input from the first UE 204 and the second UE 206) within the virtual environment. In some aspects, the first UE 204 and the second UE 206 may be provided with a starting location within the virtual environment upon initially receiving access to the virtual environment of the live event 230. After receiving their initial locations, the first UE 204 and the second UE 206 can track their own movements within the virtual environment of the live event 230 and render (e.g., be presented with) a virtual view for the user. In this way, the first UE 204 and the second UE 206 can be presented with different virtual views based on the same source information. For example, based on the same source information, the first UE 204 can be presented with a first virtual view at a first time and the second UE 206 can be presented with a second virtual view at the first time that is different from the first virtual view. Such an embodiment can be advantageous because a unique connection is not necessary for each UE that requests to view the live event 230. This reduces the amount of processing required by the network provider and allows for the flow of data to proceed mostly in one direction (e.g., from the live event 230 to the first UE 204 and the second UE 206). Such an embodiment may prove especially useful as the processing power available to XR devices continues to increase as well as the amount of users who want to view virtual content of a live event.

Figure 3:
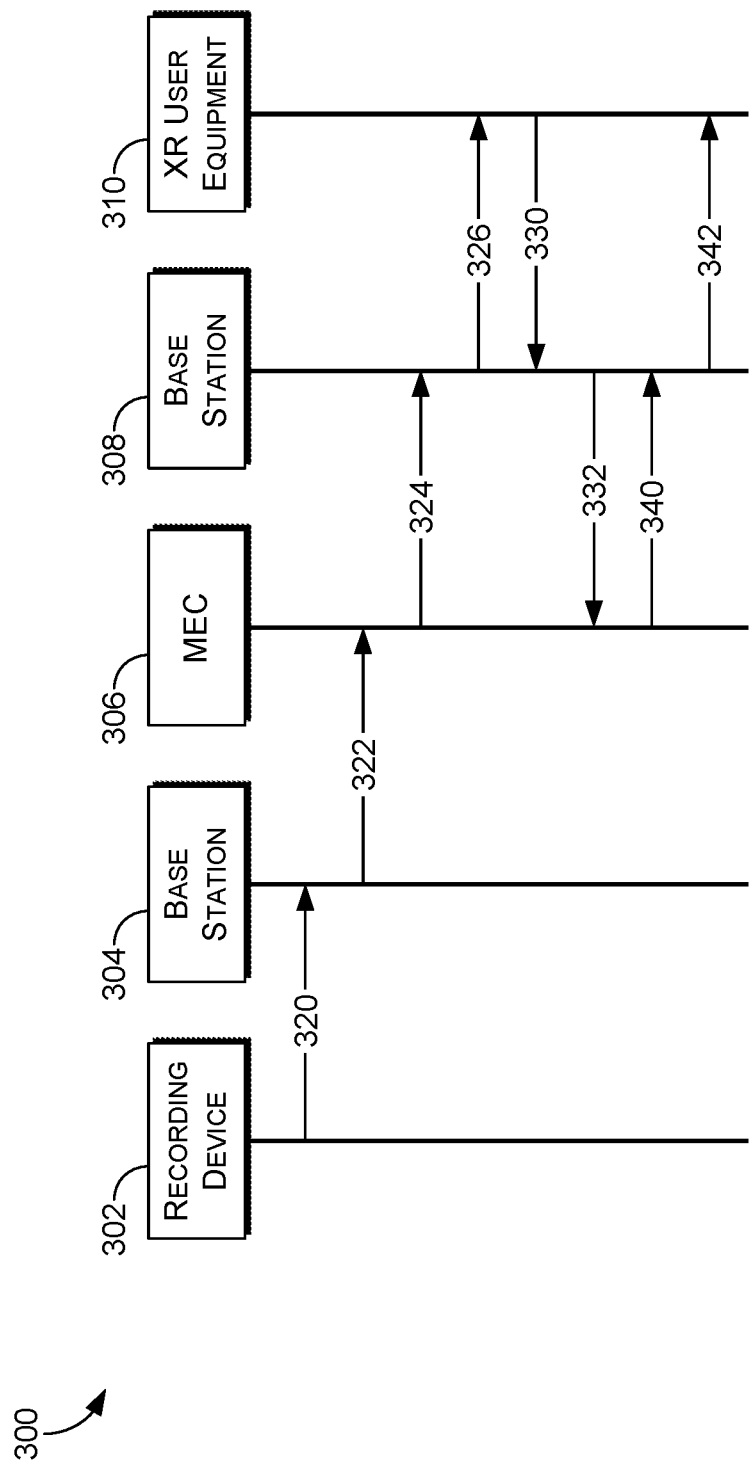
FIG. 3 depicts a call flow diagram of an exemplary method for providing real-time virtual content of a live event to a user equipment on a wireless communications network.

Turning now to FIG. 3 a representative call flow in which the present disclosure may be carried out on a wireless telecommunication network (e.g., network environment 200 of FIG. 2) is illustrated. Such a call flow is illustrated and designated generally as method 300. Method 300 is but one example of a suitable call flow and is not intended to suggest, including by the form of any illustrated component thereof, any limitation as to the scope of use or functionality of the invention. Neither should the representative call flow be interpreted as having any dependency of requirement relating to any one or combination of components illustrated. The method 300 generally represents a high-level model for wirelessly communicating between a live event, a base station and one or more XR devices in order to provide a virtual experience of the live event. The method 300 comprises a recording device 302, a base station 304, a MEC 306, a base station 308, and an XR user equipment 310. For the purposes of this disclosure, base stations 304, 306 may take the form of base station 202 of FIG. 2. Additionally, while depicted as single base stations, base stations 304, 306 can comprise one or more base stations. The MEC 306 may take the form of the MEC 220 of FIG. 2, and XR user equipment 310 can take the form of the first UE 204 and the second UE 206 of FIG. 2.

In order to present the XR user equipment 310 with a virtual view of the live event, the method 300 comprises a recording device 302. The recording device 302 can comprise any piece of hardware, software, or combination that is used to capture source information of a live event (e.g., live event 230 of FIG. 2). At step 320, the source information of the live event captured by the recording device 302 is sent to the base station 304. In some aspects, the recording device 302 processes and stores the source information at a XR local host before the source information is sent to the base station 304. At step 322, the source information is sent to the MEC 306 for centralized processing. In some aspects, the source information is sent to a MSO from the base station 304 before being received by the MEC 306. At step 324, the source information is processed by the MEC 306 and sent to the base station 308, which could be the base station 304 or a different base station. In some aspects, the processed source information is sent to a MSO from the MEC 306 before being received by the base station 308. At step 326, the XR user equipment 310 is provided with the processed source information in order to present the XR user equipment 310 with a virtual view of the live event. As discussed previously, depending how the source information is provided to the XR user equipment 310 (e.g., broadcast/multicast or unicast), method 300 may end. For example, in a broadcast/multicast embodiment, a continuous one-way flow of source information may be provided to the user equipment 310 that contains all the necessary information for the user equipment 310 to be presented with all virtual views of the live event.

In some aspects, the method 300 can continue at step 330, where a user-generated input from the XR user equipment 310 is communicated to the base station 308. At step 332, the user-generated input from the XR user equipment 310 is communicated to the MEC 306. In some aspects, the user-generated input is sent through a MSO before being received by the MEC 306. At step 340, the user-generated input can be processed by the MEC in combination with source information of the live event and newly processed source information to present the XR user equipment 310 with a new virtual view is sent to the base station 308. In some aspects, the newly processed source information is sent through a MSO before being received by the base station 308. At step 342, the newly processed source information is received by the XR user equipment 310 and the new virtual view is presented to the XR user equipment 310. In some aspects, steps 330-342 may be repeated in a continuous feedback loop.

Figure 4:
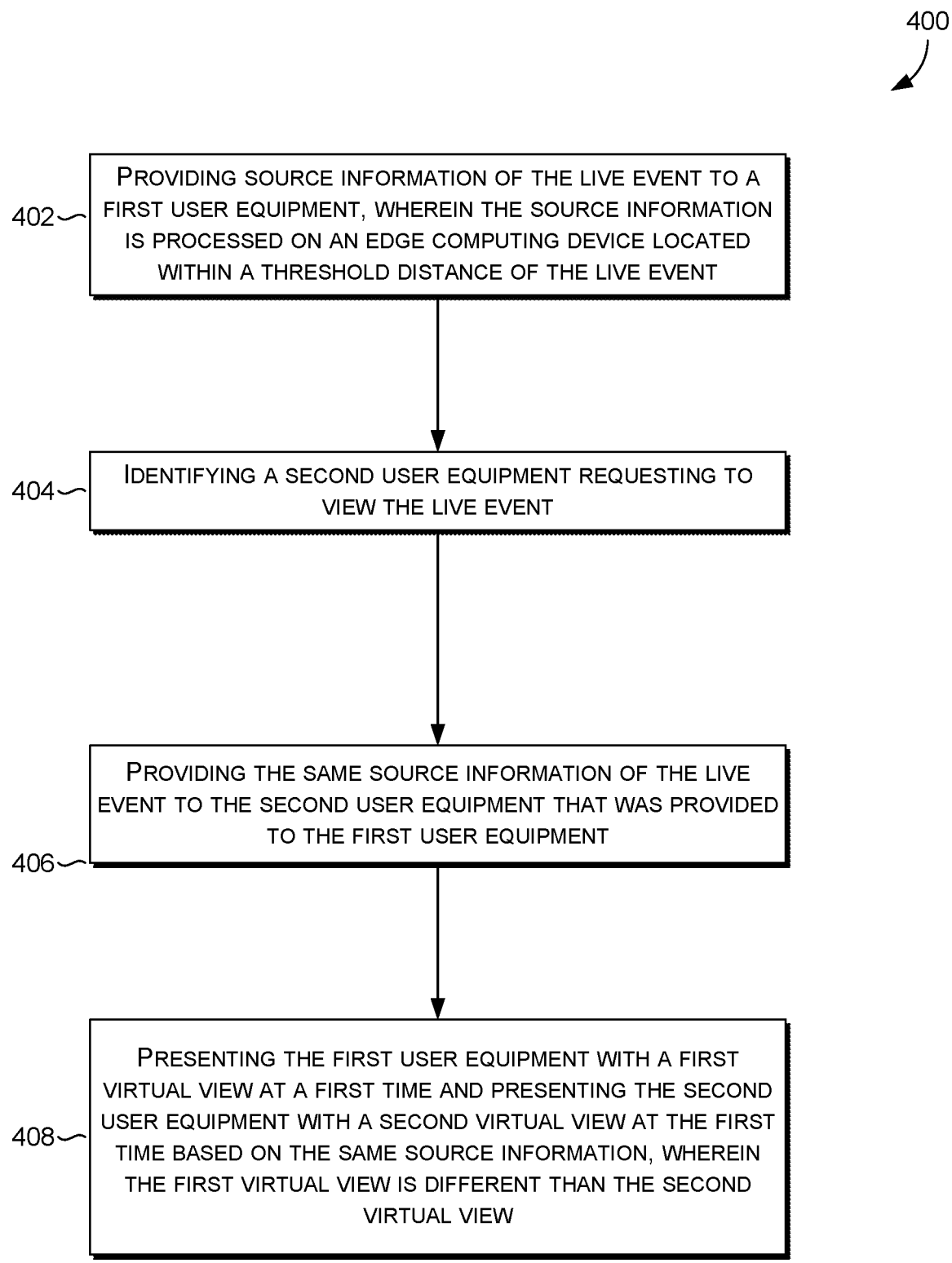
FIG. 4 depicts a flow diagram of an exemplary method for providing real-time virtual content of a live event to a user equipment on a wireless communications network.

Turning now to FIG. 4, a flow chart is illustrated for providing real-time virtual viewing content of a live event to a user equipment on a wireless communications network. At a first step 402, source information of the live event, which is processed on an edge computing device located within a threshold distance of the live event, according to any one or more aspects described with respect to FIGS. 2-3. In some aspects, the edge computing device is located at the live event. At a second step 404, a second user equipment requesting to view the live event is identified, according to any one or more aspects described with respect to FIGS. 2-3. At a third step 406, the same source information that was provided to the first user equipment is provided to the second user equipment, according to any one or more aspects described with respect to FIGS. 2-3. At a fourth step 408, the first user equipment is presented with a first virtual view at a first time and the second user equipment is presented with a second virtual view at the first time based on the same source information, wherein the first virtual view is different than the second virtual view, according to any one or more aspects described with respects to FIGS. 2-3. In some aspects, the source information contains all virtual views of the live event that can be presented to the first user device and the second user device. In some aspects, the first user device and the second user device determine their own locations with a virtual environment of the live event, and wherein the first user device and the second user device determine any virtual views they are presented with based on the source information and their locations within the virtual environment. In some aspects, the source information is provided by a dedicated network slice on the wireless communications network. In some aspects, the source information is provided as a single broadcast on the dedicated network slice that is accessible by the first user equipment and the second user equipment. In some aspects, the first user device and the second user device are provided with six degrees of freedom within a virtual environment of the live event.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A method for providing real-time virtual viewing content of a live event to a user equipment on a wireless communications network, the method comprising:
    providing source information of the live event to a first user equipment, wherein the source information is processed on an edge computing device located within a threshold distance of the live event;
    identifying a second user equipment requesting to view the live event;
    providing the same source information of the live event to the second user equipment that was provided to the first user equipment; and
    based on providing the same source information, communicating a first signal to the first user equipment that causes the first user equipment to be presented with a first virtual view at a first time and communicating a second signal to the seond user equipment that causes the second user equipment to be presented with a second virtual view at the first time, wherein the first virtual view is different than the second virtual view.

2. The method of claim 1, wherein the source information contains all virtual views of the live event that can be presented to the first user device and the second user device.

3. The method of claim 1, wherein the first user device and the second user device determine their own locations with a virtual environment of the live event, and wherein the first user device and the second user device determine any virtual views they are presented with based on the source information and their locations within the virtual environment.

4. The method of claim 1, wherein the edge computing device is located at the live event.

5. The method of claim 1, wherein the source information is provided by a dedicated network slice on the wireless communications network.

6. The method of claim 5, wherein the source information is provided as a multicast on the dedicated network slice that is accessible by the first user equipment and the second user equipment.

7. The method of claim 1, wherein the first user device and the second user device are provided with six degrees of freedom within a virtual environment of the live event.

8. One or more non-transitory computer readable media that, when executed by one or more computer processing components, cause the one or more computer processing components to perform a method for providing real-time virtual viewing content of a live event to a user equipment on a wireless communications network, the method comprising:
    providing source information of the live event to a first user equipment, wherein the source information is processed on an edge computing device located within a threshold distance of the live event;
    identifying a second user equipment requesting to view the live event;
    providing the same source information of the live event to the second user equipment that was provided to the first user equipment; and
    based on providing the same source information, communicating a first signal to the first user equipment that causes the first user equipment to be presented with a first virtual view at a first time and communicating a second signal to the second user equipment that causes the second user equipment to be presented with a second virtual view at the first time, wherein the first virtual view is different than the second virtual view.

9. The one or more non-transitory computer readable media of claim 8, wherein the source information contains all virtual views of the live event that can be presented to the first user device and the second user device.

10. The one or more non-transitory computer readable media of claim 8, wherein the first user device and the second user device determine their own locations with a virtual environment of the live event, and wherein the first user device and the second user device determine any virtual views they are presented with based on the source information and their locations within the virtual environment.

11. The one or more non-transitory computer readable media of claim 8, wherein the edge computing device is located at the live event.

12. The one or more non-transitory computer readable media of claim 8, wherein the source information is provided by a dedicated network slice on the wireless communications network.

13. The one or more non-transitory computer readable media of claim 12, wherein the source information is provided as a multicast on the dedicated network slice that is accessible by the first user equipment and the second user equipment.

14. The one or more non-transitory computer readable media of claim 8, wherein the first user device and the second user device are provided with six degrees of freedom within a virtual environment of the live event.

15. A system for providing real-time virtual viewing content of a live event to a user equipment on a wireless communications network, the system comprising:
   a mobile communications network;
   at least one node configured to provide access to the mobile communications network; and
   an extended reality manager configured to:
   providing source information of the live event to a first user equipment, wherein the source information is processed on an edge computing device located within a threshold distance of the live event;
   identifying a second user equipment requesting to view the live event;
   providing the same source information of the live event to the second user equipment that was provided to the first user equipment; and
   based on presenting the same source information, communicating a first signal to the first user equipment that causes the first user equipment to be presented with a first virtual view at a first time and communicating a second signal to the second user equipment that causes the second user equipment to be presented with a second virtual view at the first time, wherein the first virtual view is different than the second virtual view.

16. The system of claim 15, wherein the source information contains all virtual views of the live event that can be presented to the first user device and the second user device.

17. The system of claim 15, wherein the first user device and the second user device determine their own locations with a virtual environment of the live event, and wherein the first user device and the second user device determine any virtual views they are presented with based on the source information and their locations within the virtual environment.

18. The system of claim 15, wherein the edge computing device is located at the live event.

19. The system of claim 15, wherein the source information is provided by a dedicated network slice on the wireless communications network.

20. The system of claim 19, wherein the source information is provided as a multicast on the dedicated network slice that is accessible by the first user equipment and the second user equipment.

* * * * *

UNITED STATES PATENT AND TRADEMARK OFFICE
CERTIFICATE OF CORRECTION

| | | |
|---|---|---|
| PATENT NO. | : 12,413,795 B2 | Page 1 of 1 |
| APPLICATION NO. | : 18/400617 | |
| DATED | : September 9, 2025 | |
| INVENTOR(S) | : Sumanth Bellam Hemanth and Anis Adil Anis | |

It is certified that error appears in the above-identified patent and that said Letters Patent is hereby corrected as shown below:

In the Claims

Under Column no. 12, Claim 1, Line no. 10:
The line reading "second signal to the seond user equipment that causes" should read --second signal to the second user equipment that causes--

Signed and Sealed this
Eleventh Day of November, 2025

John A. Squires
*Director of the United States Patent and Trademark Office*